United States Patent
Ochsner et al.

(10) Patent No.: US 12,187,097 B2
(45) Date of Patent: Jan. 7, 2025

(54) AUTOMATIC INTERIOR PROTECTION

(71) Applicant: Rivian IP Holdings, LLC, Irvine, CA (US)

(72) Inventors: Laura MacLean Ochsner, Huntington Beach, CA (US); Ajay Panekkad, Laguna Niguel, CA (US); Ean Joshua Hall, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 64 days.

(21) Appl. No.: 17/862,641

(22) Filed: Jul. 12, 2022

(65) Prior Publication Data
US 2024/0017583 A1 Jan. 18, 2024

(51) Int. Cl.
*B60H 1/00* (2006.01)
*B60H 1/22* (2006.01)
*B60H 1/32* (2006.01)

(52) U.S. Cl.
CPC ....... *B60H 1/0075* (2013.01); *B60H 1/00271* (2013.01); *B60H 1/00735* (2013.01); *B60H 1/3219* (2013.01); *B60H 2001/2253* (2013.01); *B60H 2001/3255* (2013.01)

(58) Field of Classification Search
None
See application file for complete search history.

(56) References Cited

U.S. PATENT DOCUMENTS

| | | | |
|---|---|---|---|
| 5,595,064 A * | 1/1997 | Ikeda | B60L 50/51 62/126 |
| 8,118,237 B2 * | 2/2012 | Vyas | B60H 1/00657 236/46 C |
| 8,620,506 B2 * | 12/2013 | Kummer | H01M 10/486 180/65.21 |
| 9,272,633 B2 * | 3/2016 | Anzicek | B60L 3/04 |
| 9,446,772 B2 * | 9/2016 | Lovett | B60H 1/00778 |
| 9,862,246 B2 * | 1/2018 | Kikuchi | B60H 1/00742 |
| 10,611,211 B2 * | 4/2020 | Lee | B60H 1/00778 |
| 10,798,154 B2 * | 10/2020 | Lovett | H04L 67/125 |

(Continued)

FOREIGN PATENT DOCUMENTS

| | | | |
|---|---|---|---|
| CN | 105730187 A * | 7/2016 | |
| CN | 109863045 A * | 6/2019 | B60H 1/00378 |

(Continued)

OTHER PUBLICATIONS

Tesla's 2019 Model 3 owner's manual, p. 101 (Cabin Overheat Protection). Published Dec. 20, 2018 https://tesla-info.com/doc/m3/model_3_owners_manual_north_america_en_2019_0.pdf.

*Primary Examiner* — Jenna M Maroney
(74) *Attorney, Agent, or Firm* — Haley Guiliano LLP

(57) ABSTRACT

Illustrative examples of a vehicle system and associated methods may be directed to monitoring one or more vehicle components to prevent excess temperatures or heat. A thermal controller may be configured to determine a timer based on a predicted thermal input, and based on the timer, compare a temperature of the vehicle component to a temperature threshold. The thermal controller may be further configured to send an instruction to reduce the temperature of the vehicle component based on the comparison of the temperature to the temperature threshold.

12 Claims, 4 Drawing Sheets

(56) References Cited

U.S. PATENT DOCUMENTS

| | | | | |
|---|---|---|---|---|
| 11,623,498 B2* | 4/2023 | Setterberg | ......... | B60H 1/00285 236/49.3 |
| 2002/0161501 A1* | 10/2002 | Dulin | ................ | B60H 1/00735 701/45 |
| 2009/0193821 A1* | 8/2009 | Ozeki | ................ | B60H 1/00742 62/157 |
| 2010/0206957 A1* | 8/2010 | Vyas | ................ | B60H 1/00428 165/61 |
| 2011/0153140 A1* | 6/2011 | Datta | ................ | B60R 16/037 701/1 |
| 2011/0202217 A1* | 8/2011 | Kempton | ............. | B60L 53/305 320/109 |
| 2013/0079978 A1* | 3/2013 | Uyeki | .............. | B60H 1/00771 701/36 |
| 2015/0345962 A1* | 12/2015 | Graham | .............. | G06Q 10/047 701/423 |
| 2016/0107656 A1* | 4/2016 | Lovett | ................ | B60H 1/00778 701/22 |
| 2016/0207375 A1* | 7/2016 | Gauthier | ............ | B60H 1/00778 |
| 2017/0134554 A1* | 5/2017 | Lee | ........................ | H04L 12/66 |
| 2018/0154793 A1* | 6/2018 | Jun | .................... | B60H 1/00778 |
| 2021/0035426 A1* | 2/2021 | Grinberg | ................ | G08B 21/02 |
| 2022/0324351 A1* | 10/2022 | Ibanez | ................ | H01M 10/635 |
| 2023/0196899 A1* | 6/2023 | Yilmaz | ................ | A61B 5/0816 340/573.1 |
| 2023/0286353 A1* | 9/2023 | Patel | .................. | B60H 1/00778 |
| 2024/0017583 A1* | 1/2024 | Ochsner | ............ | B60H 1/00778 |

FOREIGN PATENT DOCUMENTS

| | | | | |
|---|---|---|---|---|
| CN | 111231870 A | * | 6/2020 | |
| DE | 102019125302 A1 | * | 3/2020 | ......... B60H 1/00742 |
| WO | WO-2015185196 A1 | * | 12/2015 | ......... B60R 16/0239 |

* cited by examiner

AUTOMATIC INTERIOR PROTECTION

INTRODUCTION

The present disclosure is directed to controlling the temperature of a vehicle, and more particularly to cooling a vehicle interior to reduce excess heat in the vehicle interior.

SUMMARY

In at least some example illustrations, a vehicle system includes a vehicle component in an interior of a vehicle. The vehicle system may further include a thermal controller configured to determine a timer based on a predicted thermal input, and based on the timer, compare a temperature of the vehicle component to a temperature threshold. The thermal controller may be further configured to send an instruction to reduce the temperature of the vehicle component based on the comparison of the temperature to the temperature threshold.

In at least some example approaches, the thermal controller has a sleep state, and is configured to start the timer based on an initiation of the sleep state and to wake from the sleep state based on the timer expiring.

In at least some examples, the vehicle system includes one or more additional controllers having a sleep state, and the thermal controller is configured to maintain the one or more additional controllers in their sleep state, respectively, when the temperature is below the temperature threshold.

In at least some example approaches, the thermal controller is configured to periodically wake to a stealth mode, wherein the one or more additional controllers remain in a sleep state when the thermal controller determines the temperature of the vehicle component is below the temperature threshold.

In at least some examples, the predicted thermal input is based on at least one of a solar load, an ambient temperature, or a temperature of the vehicle component.

In at least some example illustrations, the time period is determined based on at least one of a difference between the temperature of the vehicle component and the temperature threshold, or a predicted solar load.

In at least some examples, the thermal controller is configured to enter a sleep state, and a core controller is configured to initiate the sleep state of the thermal controller based on at least one of a detection of a vacant vehicle interior, a reduction in a current draw of a vehicle battery, or a contactor position of the vehicle battery.

In at least some example approaches, the vehicle system is configured to, in response to sending the instruction, automatically determine a conditioning response based upon the temperature of the vehicle component.

In at least some examples, the temperature threshold is a first temperature threshold, and the conditioning response include (a) cooling the vehicle interior by circulating air to the vehicle interior when the temperature of the vehicle component is below a second temperature threshold greater than the first temperature threshold, and (b) refrigerating the circulated air when the temperature of the vehicle component exceeds the second temperature threshold.

In at least some example illustrations, the thermal controller is configured to control a heating/ventilation/air conditioning (HVAC) system associated with the vehicle interior.

In at least some example approaches, the vehicle component includes one or more display screens in the vehicle interior.

In at least some examples, the thermal controller is further configured to receive a manual input to initiate cooling the interior.

In at least some example illustrations, a method includes determining a timer using a thermal controller. The timer is based on a predicted thermal input. The method further includes comparing a temperature of a vehicle component to a temperature threshold based on the timer, using the thermal controller. The method further includes sending an instruction to reduce the temperature of the vehicle component based on the comparison of the temperature to the temperature threshold.

In at least some example approaches, the method further includes starting the timer based on an initiation of a sleep state of the thermal controller, and waking the thermal controller from the sleep state based on the timer expiring.

In at least some examples, the method further comprises maintaining one or more additional controllers in a sleep state, respectively, when the temperature is below the temperature threshold.

In at least some example approaches, a method also includes periodically waking the thermal controller to a stealth mode, wherein the one or more additional controllers remain in the sleep state when the thermal controller determines the temperature of the vehicle component is below the temperature threshold.

At least some example methods also include initiating a sleep state of the thermal controller using a core controller, wherein the sleep state is initiated based on at least one of a detection of a vacant vehicle interior, a reduction in current draw of a vehicle battery, or a contactor position of the vehicle battery.

In at least some example methods, the predicted thermal input is based upon at least one of a solar load, an ambient temperature, or a temperature of the vehicle component.

In at least some example approaches, a non-transitory computer-readable medium is provided having non-transitory computer-readable instructions encoded thereon that, when executed by a processor, cause the processor to: determine a timer based on a predicted thermal input, based on the timer, compare a temperature of a vehicle component to a temperature threshold. The instructions may cause the processor to send an instruction to reduce the temperature of the vehicle component based on the comparison of the temperature to the temperature threshold.

In at least some examples, the predicted thermal input is based upon at least one of a solar load, an ambient temperature, or a temperature of the vehicle component.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
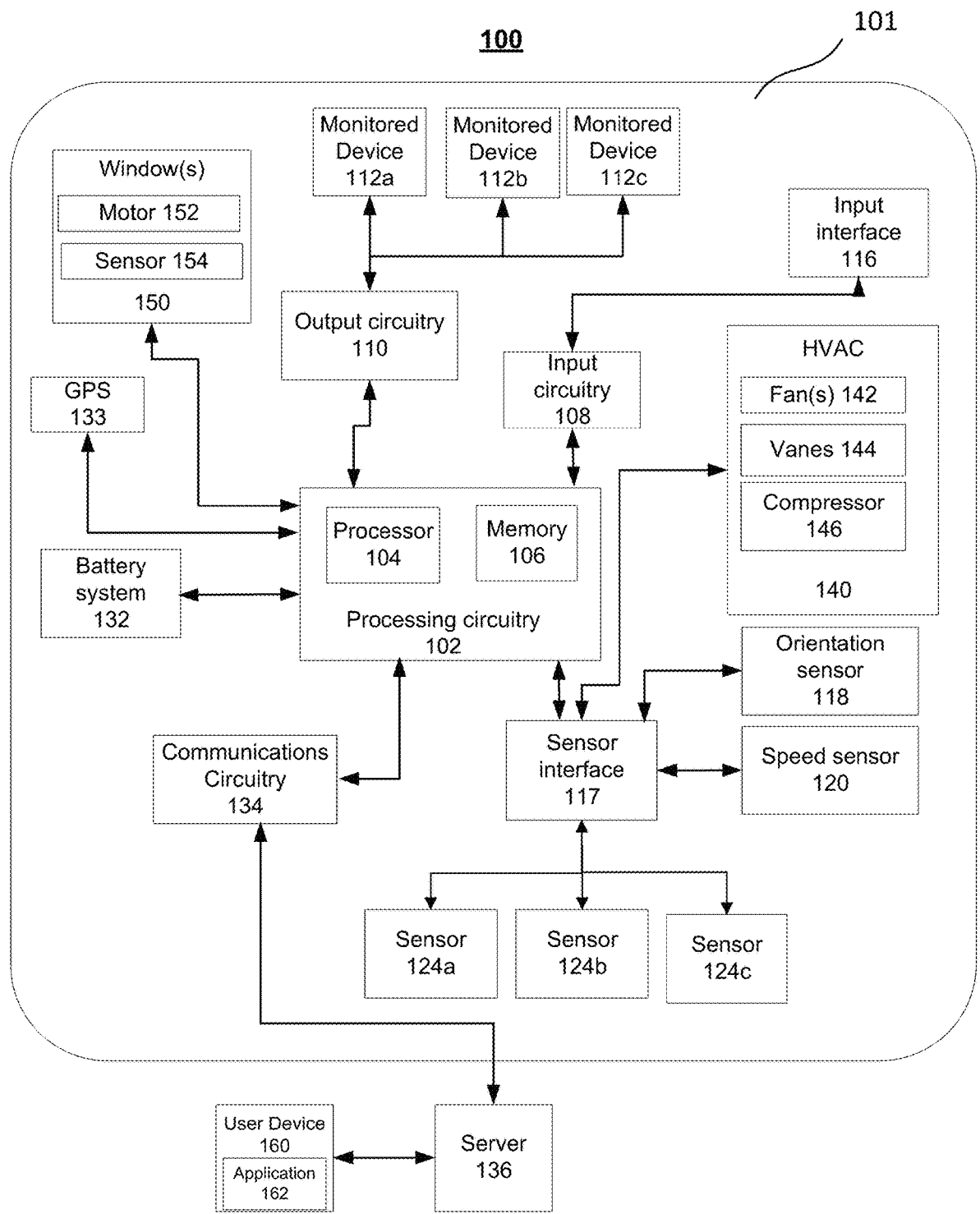
FIG. 1 shows a schematic illustration of a vehicle, in accordance with some embodiments of the present disclosure.

Solar energy, particularly in warmer climates, can elevate temperatures within a vehicle interior quickly and significantly. Repeated hot/cool cycles can have a negative effect on the durability and quality of interior components, particularly for more temperature-sensitive components such as electronics, touchscreens, or the like, resulting in warranty and/or quality issues. In extreme cases, high temperatures can cause failure of electronic components. Managing interior temperatures can be difficult particularly in electric vehicle applications where power resources that might be employed for monitoring or responding to extreme temperatures is at a premium. As a result, interior temperature monitoring methodologies typically cease after a period of time to avoid consuming electrical energy stored in vehicle batteries.

Accordingly, example illustrations herein are generally directed to a vehicle system that monitors interior temperature with a predictive control methodology based, for example, a predicted thermal input. As examples, a predicted thermal input may be based on expected solar loads, ambient temperatures, or a temperature of a vehicle component of the interior. In some example approaches, a thermal management module (TMA/I) or thermal system controller may be configured to condition a vehicle to maintain interior temperature, e.g., to avoid excess temperatures of vehicle components such as touch screens, displays, or any other interior component.

Generally, when a driver has turned off and exited a vehicle, the vehicle may be in a "sleep" state. In this condition, electronics of the vehicle are powered down or otherwise in a low-power state to prevent power consumption from vehicle batteries. Before entering this sleep state, a vehicle system or controller, e.g., a thermal system controller of the vehicle, may determine a timer based on a predicted solar input, and/or a time period for the timer. The thermal system controller may then wake to a "stealth" mode after the timer expires. In this "stealth" mode, the vehicle or system thereof may partially awaken, with at least some portion of the vehicle or systems remaining in a sleep state or a low-power state. In one example of the "stealth" mode, a thermal system controller determines if other vehicle components e.g., controllers or systems for directly managing temperature within the vehicle, need to be woken up from their own respective sleep states, such as when a temperature of desired vehicle components is elevated above a threshold. The thermal system controller can wake up additional vehicle components or controllers if the vehicle interior needs to be conditioned or reduced in temperature, otherwise the thermal system controller may go back to the sleep state. Before re-entering the sleep state, a second/subsequent timer and/or associated time period may be determined and/or set for the vehicle to re-activate the "stealth" mode, in which the process of measuring temperature or another relevant parameter is repeated.

Accordingly, example vehicles and systems may maintain the "sleep state" to a maximum extent, reducing power draw while also maintaining cabin quality by calculating a timer to wake up the thermal system controller. While this logic may be particularly useful for more sensitive components such as interior touchscreens or other electronics, the logic can be extended to other parts of the vehicle such as advanced driver assistance system (ADAS) components or autonomous driving systems.

While example approaches may be particularly useful when the vehicle does not have access to power, e.g., the vehicle is parked in a lot or other location without access to charging, as will be discussed further below at least some example approaches facilitate monitoring and conditioning of a vehicle interior in other situations. Merely by way of example, a vehicle parked in a driveway and plugged in may also periodically monitor temperatures according to predicted need to condition the interior.

Accordingly, the example approaches herein may facilitate protection of vehicle interior components while not requiring user input, and in a manner that minimizes power consumption by reducing unneeded temperature checks and associated waking/sleep cycles. The vehicle may determine whether/when there is a need to wake up vehicle systems/controller automatically, and without user input. Additionally, the vehicle may determine appropriate levels of intervention for interior conditioning, e.g., whether to run an air conditioning/refrigeration system of the vehicle to cool the interior, or merely actuate a blower or open a vehicle window.

Turning now to FIG. 1, an example vehicle 101 is illustrated. FIG. 1 shows a block diagram of components of a system 100 of vehicle 101 configured to monitor vehicle interior components, in accordance with some embodiments of the present disclosure. In some embodiments, the system 100 of the vehicle 101 is configured to respond to detected elevated temperatures by conditioning the vehicle interior, e.g., to introduce cooler air to the interior upon detection of an elevated temperature within the vehicle interior. Vehicle 101 may be a car (e.g., a coupe, a sedan, a truck, an SUV, a sport utility vehicle, a full-size van, a minivan, a delivery van, a bus), a motorcycle, an aircraft (e.g., a drone), a watercraft (e.g., a boat), or any other type of vehicle. Vehicle 101 may include any kind of motor or motors capable of generating power (e.g., gas motors, gas-electric hybrids motors, electric motors, battery-powered electric motors, hydrogen fuel cell motors).

Vehicle 101 may comprise processing circuitry 102 which may include processor 104 and memory 106. Processor 104 may comprise a hardware processor, a software processor (e.g., a processor emulated using a virtual machine), or any combination thereof. In some embodiments, the processing circuitry is part of an on-board computer, that is configured to operate the vehicle. In some embodiments, the on-board computer may be configured to operate the vehicle autonomously or semi-autonomously. The on-board computer may include communications drivers that communicate with servers 136. In some examples, communications circuitry 134 may facilitate communication with a user device 160 communicatively linked with the server 136, such as a mobile phone, computer, or the like. User device 160 may be configured to communicate with server 136 in any manner that is convenient. As will be discussed further below, the user device 160 may support an application 162 to facilitate information being received by a user of the user device 160, and/or instructions or commands from the user device 160 to the vehicle 101. In some embodiments, processor 104 and memory 106 in combination may be referred to as processing circuitry 102 of vehicle 101. In some embodiments, processor 104 alone may be referred to as processing circuitry 102 of vehicle 101. Memory 106 may include hardware elements for non-transitory storage of commands or instructions, that, when executed by processor 104, cause processor 104 to operate vehicle 101 in accordance with embodiments described herein. Processing circuitry 102 may be communicatively connected to components of vehicle 101 via one or more wires, or via wireless connection(s). For example, temperature or other data collected by sensors in the vehicle, as will be discussed below, may be communicated to the processing circuitry 102 for determining timers or responses to detected temperature conditions.

Processing circuitry 102 may be communicatively connected to input interface 116 (e.g., a steering wheel, a touch screen display, buttons, knobs, a microphone, or other audio capture device, etc.) via input circuitry 108. In some embodiments, a driver and/or occupant of vehicle 101 may be permitted to select certain settings in connection with the operation of vehicle 101. In some embodiments, processing circuitry 102 may be communicatively connected to global positioning satellite (GPS) system 133 or other positioning devices of vehicle 101, where the driver may interact with the GPS system via input interface 116. GPS system 133 may be in communication with multiple satellites and/or servers 136 remote from vehicle 101 to ascertain the driver's location or provide navigation directions to processing circuitry 102, for example. As another example, the positioning device may operate on terrestrial signals, such as cell phone signals, Wi-Fi signals, or ultra-wideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106). In some embodiments, processing circuitry 102 uses the determined location to obtain information regarding ambient temperatures, solar load, or the like, which may be used to predict whether/when to wake vehicle systems or controllers to for monitoring temperatures of vehicle components.

Processing circuitry 102 may be communicatively connected to one or more monitored devices 112a, 112b, and/or 112c, e.g., by way of output circuitry 110. Devices 112 may be, for example, displays located at a dashboard of vehicle 101 and/or a heads-up display at a windshield of vehicle 101. For example, an interface for GPS system 133 or an interface of an infotainment system may be generated for display, and display 112 may comprise an LCD display, an OLED display, an LED display, or any other type of display. While three devices/displays 112 are illustrated, it should be understood that any number of devices or displays 112 may be present in a vehicle 101. The display(s) 112 may be configured to facilitate user inputs, e.g., via a touchscreen such as a capacitive or resistive touchscreen. Accordingly, the display(s) may be employed as a user interface for the vehicle 101.

Processing circuitry 102 may be communicatively connected (e.g., by way of sensor interface 117) to sensors 124a, 124b, and 124c of the vehicle. In an example, each sensor 124 is positioned in the vehicle interior near or within a corresponding display 112. In some embodiments, processing circuitry 102 may consider the temperature of the displays 112 or other vehicle components based upon measurements by the sensors 124 when determining whether a conditioning response is necessary, e.g., if components of the vehicle are above a threshold temperature. In some examples, processing circuitry 102 may determine a type of conditioning response, e.g., whether to condition the interior of the vehicle 101 by opening a vehicle window, by circulating air to the interior to an interior of the vehicle 101, or by running an air conditioning or refrigeration system to further cool air circulated to/within the interior of the vehicle 101, merely as examples.

Processing circuitry 102 may further be communicatively connected to a heating/ventilation/air conditioning (HVAC) system 140 of the vehicle 101. The HVAC system 140 may include, for example, one or more fans 142 configured to pump or circulate air in an interior of the vehicle 101. Vanes 144 may be configured to direct air selectively to different areas of the vehicle 101, e.g., to a front or rear passenger compartment, a driver/passenger side, etc. of the vehicle 101. The HVAC system 140 may also include a compressor 146 configured to refrigerate air, e.g., as part of an air conditioning system, to provide cooled air. While example illustrations herein are provided in the context of the HVAC system 140 having compressor 146, it should be understood that other types of heating/cooling systems, e.g., using a heat pump, may be employed in the context of the example illustrations.

Processing circuitry may further be communicatively connected to one or more vehicle windows 150. The windows may be positioned on corresponding doors (not shown) of the vehicle and may be operated by respective motors 152. The motors 152 may open and close the vehicle windows. Motor 152 may include, for example, a DC motor (e.g., permanent magnet motor, brushed or brushless motor, wound stator), an alternating current (AC) motor (e.g., an induction motor), any other suitable motor having any suitable number of poles and phases, or any combination thereof. For example, motor 152 may include a permanent magnet DC motor configured to operate at 12 VDC. Sensor(s) 154 may indicate a position of each window 150 and may include encoders for determining a position of the window 150 or motor 152, merely as one example.

Processing circuitry 102 may be communicatively connected to battery system 132, which may be configured to provide power to one or more of the components of vehicle 101 during operation. In some embodiments, vehicle 101 may be an electric vehicle or a hybrid electric vehicle. In some embodiments, the processing circuitry 102 may monitor the environment surrounding the vehicle by utilizing a plurality of battery cells packaged together to create one or more battery modules or assemblies to store energy and release the energy upon request.

Figure 5:
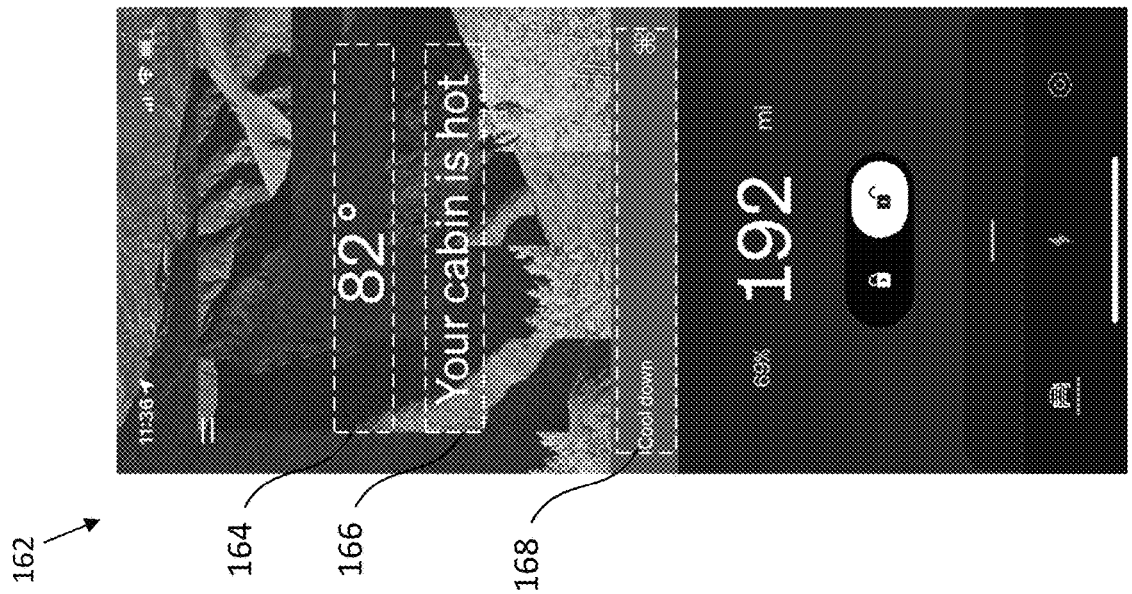
FIG. 5 shows a mobile application for communicating with a vehicle, according to an example approach.

Generally, the vehicle 101 may be parked or temporarily stored in a lot, garage, street, or other location. To the extent the location of the vehicle 101 is warm or open to exposure from the sun, interior temperature of the vehicle 101 may become elevated. Accordingly, the processing circuitry may generally monitor conditions of interior components, e.g., one or more displays 112, and condition the interior as needed, e.g., to cool the interior to reduce excess heat within the vehicle interior. In some examples, the vehicle 101 may communicate with a user via the mobile device 160, e.g., to provide notifications of vehicle activities, monitoring of temperatures of vehicle interior and/or components such as the displays 112. In addition to responses initiated by the vehicle as described herein, a user may receive notifications of interior temperatures or other conditions, and initiate commands such as to cool the vehicle 101 and/or interior components. For example, as illustrated in FIG. 5, application 162 supported by the mobile device 160 (not shown in FIG. 5) may include a temperature indication field 164 configured to display an interior temperature of the vehicle 101. A messaging field 166 may provide information or suggested instructions, e.g., that the interior/cabin is a relatively hot temperature (or nominal, or other). A selection field 168 may allow a user of the application 162 to initiate cooling of the vehicle 101.

Figure 2:
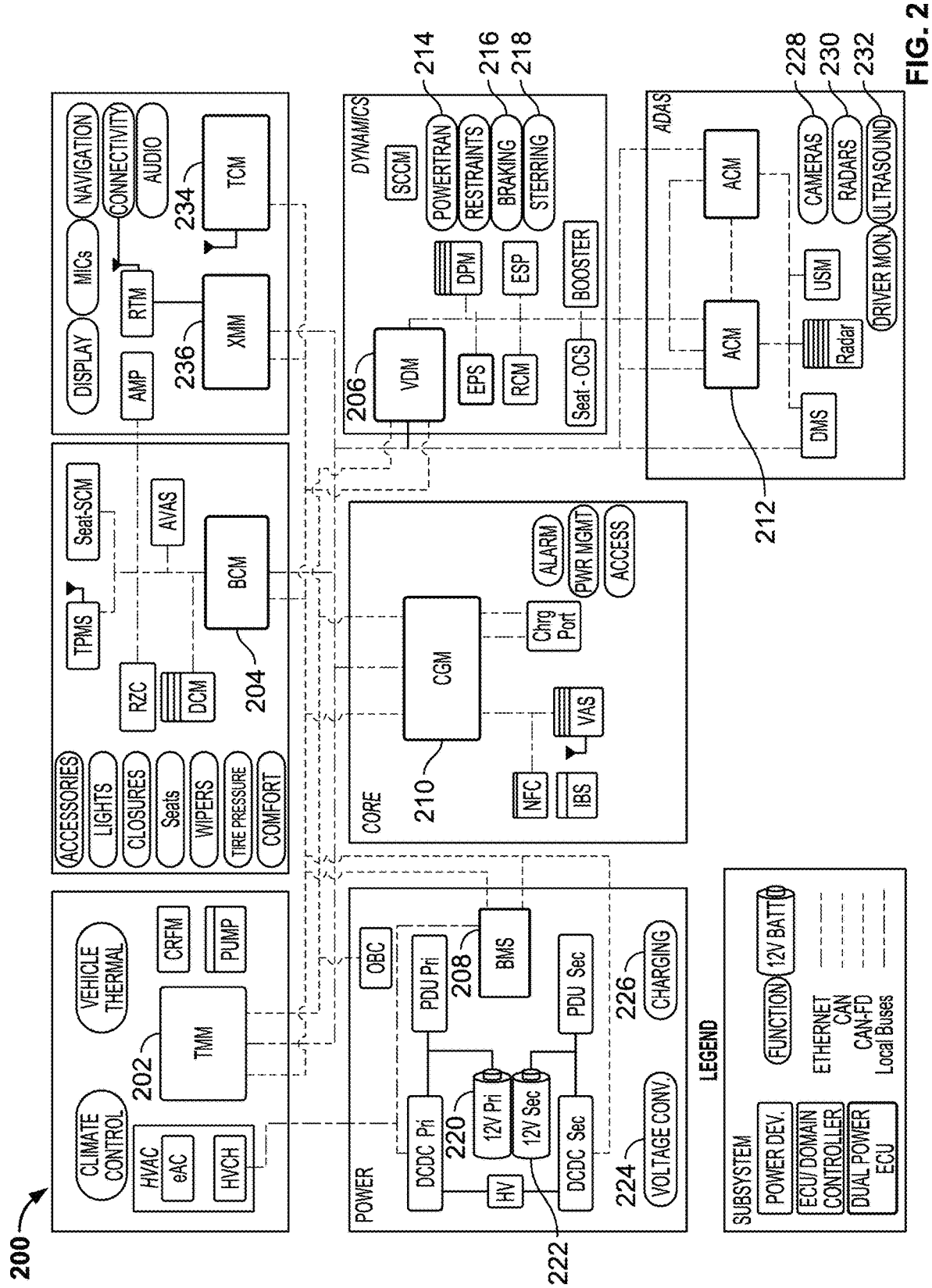
FIG. 2 shows a schematic illustration of a processing circuitry for a vehicle, e.g., the vehicle of FIG. 1.

Turning now to FIG. 2, an example processing circuitry 200 for a vehicle is illustrated and described in further detail. The processing circuitry 200 may include a plurality of controllers or modules configured to perform various functions or tasks of the vehicle. Controllers, modules, or other elements of the processing circuitry 200 may communicate via a communications bus or the like, without limitation. In an example, the processing circuitry 200 corresponds to processing circuitry 102 of vehicle 101. While the processing circuitry 200 is shown comprising multiple controllers or modules to provide the various functions described further below, it should be understood that in other example approaches the functions of the various modules/controllers may be physically implemented on a single controller or, for that matter, any number of controllers.

The processing circuitry 200 may include a thermal controller or thermal management module 202, which generally facilitates monitoring and control of heating and cooling with respect to an interior of the vehicle 101. The thermal controller 202 may be in communication with systems of vehicle 101 for conditioning a vehicle interior, e.g., an HVAC system, air conditioning or refrigeration system, or the like.

The processing circuitry 200 may also include a body control module 204, which may generally control aspects of various body components of the vehicle 101, such as vehicle closures, lights, accessories, tire pressure, and/or seats, merely as examples. In an example approach, windows 150 may be controlled by the body control module 204.

The processing circuitry 200 may also include a vehicle dynamics module (VDM) 206, which generally may control aspects of vehicle movement and/or dynamics. In an example, vehicle dynamics module 206 is in communication with a vehicle powertrain 214, e.g., including an electric motor and associated drive systems. VDM 206 may also be in communication with a braking subsystem 216 of the vehicle 101, as well as a steering subsystem 218 of the vehicle 101. The VDM 206 may facilitate implementation of traction control or other control systems configured to maintain control of the vehicle 101 while traversing on or off road.

The processing circuitry 200 may also include a battery management system (BMS) 208, which generally may facilitate control of one or more battery subsystems of the vehicle 101. In an example, BMS 208 is in communication with a high-voltage battery pack 220 and a low-voltage or accessory battery 222. The high-voltage battery pack may be configured to provide motive power to one or more electric motors configured to provide propulsion to ground-engaging wheel(s) of the vehicle 101. By comparison, the low-voltage battery pack 222 may provide power to accessories of the vehicle, controllers included in processing circuitry 200, or the like. A voltage converter 224 may facilitate supply of power between the battery packs 220, 222. In an example, the high-voltage battery pack 220 may provide electrical power to the low-voltage battery pack 222 upon the voltage being "stepped down" to an input voltage appropriate for the low-voltage battery pack. The BMS 208 may also be in communication with a charger 226 configured to receive electrical power from an external source, e.g., for charging the battery pack 220.

The processing circuitry 200 may also include a core controller or core module controller 210, which generally may operate as a master controller of the processing circuitry 200 and/or the vehicle 101. For example, in cases where a vehicle is in a sleep state and thermal system controller determines to wake the vehicle or other components of the vehicle (e.g. upon determination that the vehicle interior should be conditioned), the thermal controller 202 may wake the core controller 210. The core controller 210 may also determine whether/when the vehicle should enter a sleep state, e.g., whether a user has left the vehicle 101, turned the vehicle 101 off, etc.

The processing circuitry 200 may also include an autonomy control module (ACM) 212, which generally may facilitate control of movements of the vehicle 101, including implementation of autonomous driving. In an example, ACM 212 is in communication with cameras 228, radar 230, and ultrasound 232 for determining surroundings of the vehicle 101. The ACM 212 may be in communication with the VDM 206 and may thereby coordinate control of vehicle powertrain and control systems to guide the vehicle autonomously, semi-autonomously, or under manual control by a vehicle driver.

The processing circuitry 200 may also include a telematics control module (TCM) 234 and Experience Management Module (XMM) 236. Generally, the TCM 234 controls aspects of a telematics, navigation, and/or guidance system. The TCM 234 may communicate with displays, user interfaces or graphical user interfaces, speakers for providing audio/sound feedback, or the like. TCM 234 may also communicate with the Cloud, internet, or other information systems as part of providing information to a vehicle user regarding routing, directions, guidance, or the like. The XMM 236 may generally facilitate control of the displays, user interfaces, controls, or other components a user interacts with in vehicle 101.

It should be noted that while example approaches herein discuss the TMM waking other modules of the vehicle from a sleep state, these other modules may independently wake from the sleep state. Merely as one example, the BMS 208 may wake upon detection of the low-voltage system being in a low state of charge. As another example, the TCM 234 may wake periodically to receive updates from a central office or controller.

Figure 3:
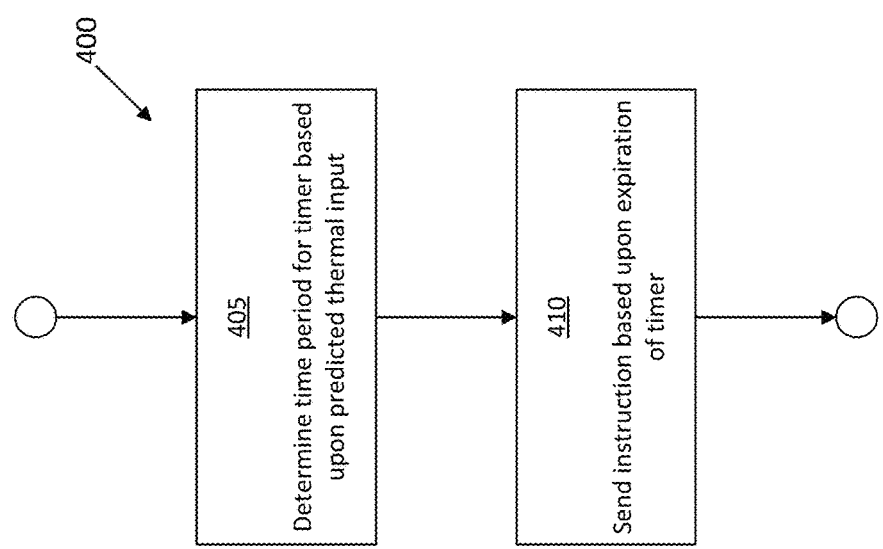
FIG. 3 shows a flowchart of an illustrative process for determining a time period for a timer, according to an example approach.

Turning now to FIG. 3, an example process 400 for determining a timer, e.g., having a time period associated with waking a vehicle system, is illustrated and described in further detail. Process 400 may begin at block 405, where a timer is determined based upon a predicted thermal input. As discussed further below, the thermal input may be based on, merely as examples, a solar load, an ambient temperature, and/or a temperature of an interior of a vehicle or component(s) of the interior. In some examples, the timer is set after a sleep state for a vehicle system is initiated, e.g., when the vehicle is turned off. The sleep state may be initiated based on at least one of a detection of a lack of a user in the vehicle interior, a reduction in current draw of a vehicle battery, or a contactor position of the vehicle battery, merely as examples. Other indicators of a vehicle being parked or otherwise left by a user may be used. Process 400 may then proceed to block 410.

At block 410, responsive actions may be initiated based on the timer, e.g., an expiration of the timer. In an example, an instruction may be sent causing the vehicle 101 to cool the interior. Example instructions may be initiated or sent in any manner that is convenient. For example, the thermal controller 202 may compare a current temperature of the vehicle component to a first temperature threshold. An instruction or command may be sent based upon the comparison. In an example, when the temperature is above the threshold, the thermal system controller 202 may send an instruction causing the vehicle 101 to reduce the temperature of the interior component. In some examples, the thermal controller 202 sends an instruction to wake one or more additional controllers, e.g., core controller 210. The core controller 210 or other additional controllers of vehicle 101 may reduce the temperature of the interior component (e.g., display(s) 112) by cooling the interior of the vehicle 101. Merely as examples, the core controller 210 (or, for that matter, thermal controller 202) may send an instruction open a window 150 of the vehicle 101, and/or or circulate air to the interior of the vehicle 101 by running a fan 142 and opening or directing vanes 144 of the HVAC system 140. As will also be discussed further below, in some examples more significant cooling of an interior component of the vehicle 101 may be initiated, e.g., by refrigerating air that is being circulated to the interior of the vehicle 101. For example, where temperatures of an interior component are determined to be elevated above a higher threshold temperature, a solar load is relatively high, and/or an ambient temperature is relatively high, it may be desirable to undertake more significant interventions to cool the interior of the vehicle 101, such as by running the compressor 146 of the HVAC system 140. Accordingly, a vehicle interior may be cooled to reduce the temperature of the vehicle component as needed. When a temperature of an interior component, e.g., display(s) 112, is measured to be below the temperature threshold or otherwise determined not to be in need of cooling, the one or more additional controllers may remain in the sleep state. It should be understood that comparisons of temperatures, e.g., of devices such as displays 112, are not limited to above/below comparisons. For example, thresholds and a temperature of a monitored device 112 may be analyzed to determine whether the temperature is within a predetermined margin from the threshold or the like to determine whether conditioning of the vehicle interior or cabin is appropriate.

Process 400 may repeat, such that the thermal controller 202 periodically wakes as a result of a timer, e.g., due to the timer expiring. A time period for the timer may be determined at each occurrence at block 320 based upon a predicted thermal input that is determined from prevailing conditions as described above. The stealth mode of the thermal controller 202, e.g., with periodic waking upon expiration of the timer, may generally allow other controllers of the vehicle 101, e.g., core controller 210, to remain in respective sleep states or modes to minimize power consumption, with the thermal controller 202 waking periodically as determined by the prevailing conditions to also reduce the need for frequent waking from the sleep state to initiate measurements of the temperature of the vehicle component that may not be necessary.

Figure 4:
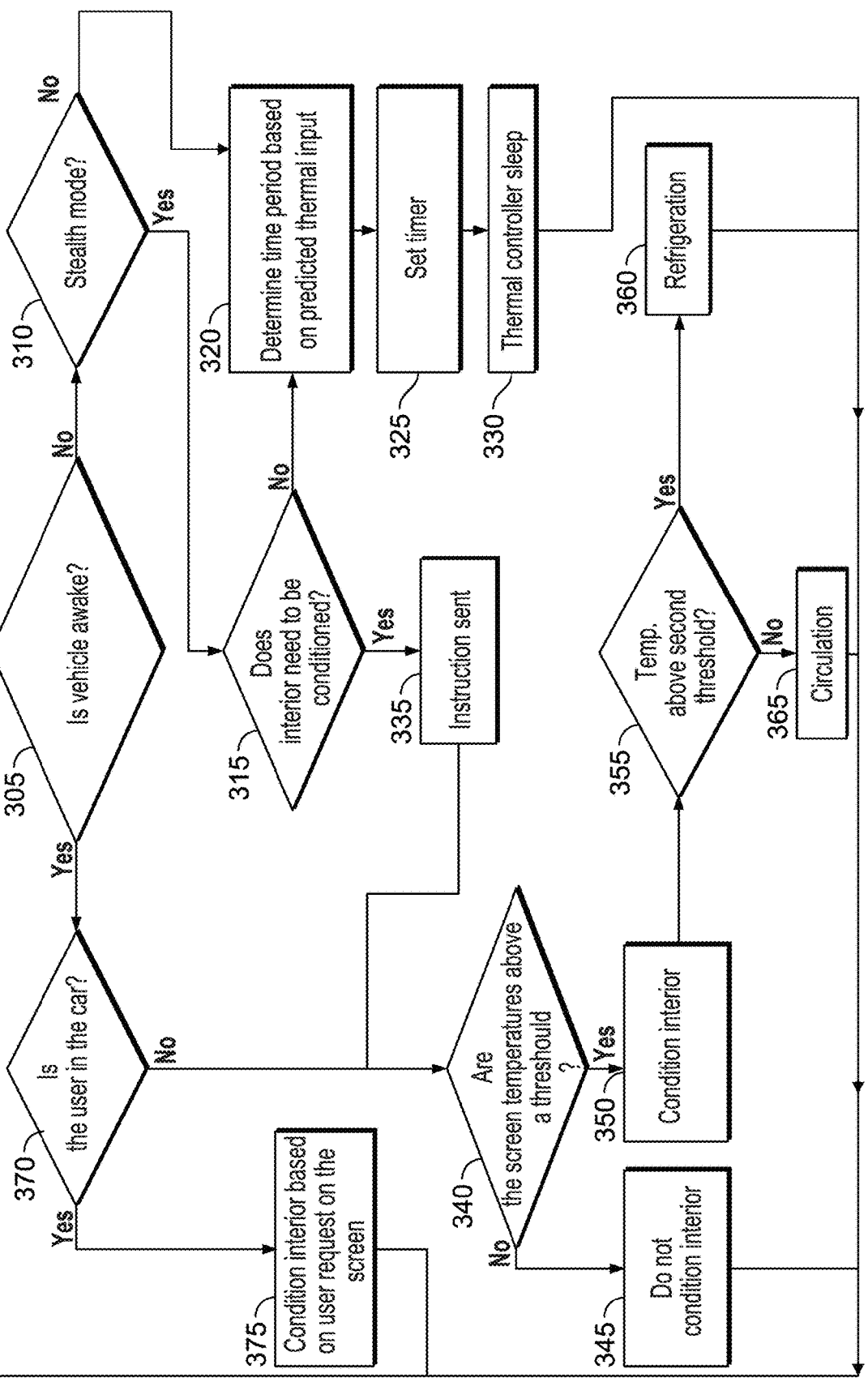
FIG. 4 shows a flowchart of an illustrative process for monitoring temperature of one or more vehicle interior components, in accordance with some embodiments of the present disclosure.

Turning now to FIG. 4, an example process 300 of monitoring and conditioning a vehicle interior, e.g., to control temperature exposure of vehicle interior components, is illustrated and described in further detail. As will be apparent from the description that follows, aspects or steps of process 300 may include the determination of a time period for a timer, and use of the timer as a basis for sending an instruction to initiate cooling of a vehicle interior component, e.g., as described above with respect to the example process 400.

Process 300 may begin at block 305, where process 300 may query whether the vehicle is awake, e.g., the vehicle is not in a sleep mode or low power mode. For example, a vehicle may be in a sleep mode when the vehicle is turned off and not plugged into a power source, e.g., for charging of vehicle batteries. It should be noted that a sleep mode or state of a vehicle may be automatically initiated, e.g., using the core controller 210. Merely as examples, the sleep state may be initiated by vehicle 101 based on detecting a driver or vehicle user leaving the vehicle or not being present in the vehicle, a reduction or cessation in current draw with respect to a vehicle battery, and/or a connected state of the vehicle battery (e.g., if a battery contactor is open, thereby electrically disconnecting the vehicle battery). If process 300 determines that the vehicle is in a sleep mode, process 300 may proceed to block 310. Alternatively, if process 300 determines that the vehicle is awake, process 300 may proceed to block 370.

Blocks 310-335 generally describe a strategy for monitoring temperature while at least some portion of the vehicle is in a sleep state, e.g., when the vehicle is not in use and is not plugged into a power source for charging, and selectively waking the vehicle system or components thereof when appropriate or necessary to condition the vehicle interior. At block 310, process 300 may query whether the vehicle is in a "stealth" mode, e.g., where one or more controllers designated for low-power monitoring of a vehicle sleep state and/or interior conditioning may be awake. As noted above, in an example illustration of a stealth mode, the thermal controller 202 is awake (e.g., for monitoring temperatures of devices 112 within the vehicle interior) while the remaining controllers/modules of processing circuitry 200 are asleep or in a low-power state. Where process 300 determines that the thermal controller 202 is awake (e.g., in a stealth mode), process 300 may proceed to block 315. Alternatively, if process 300 determines that the thermal controller 202 is not awake and thus not in stealth mode, process 300 may proceed to block 320. As noted above, the thermal controller 202 may periodically wake and determine whether conditioning of a vehicle interior or cabin is needed, and example determinations of a timer associated with thermal controller 202 are described further below. When the thermal controller 202 wakes, process 300 will proceed to block 315 by determining that the thermal controller 202 is awake at block 310.

At block 315, process 300 may query whether the vehicle interior needs to be conditioned. Process 300 may determine whether conditioning is needed based upon measurement of temperatures within the vehicle interior, e.g., a cabin or interior temperature, or a temperature of displays 112 based upon temperature sensors 124. The initial determination of whether the vehicle interior/cabin may need to be conditioned may be made based on a measured temperature within the vehicle interior, and/or an ambient temperature around the vehicle, merely as examples. In an example approach, the thermal controller 202 may use a comparison of a temperature of a vehicle component, e.g., of display 112 as measured by sensor 124, with a first temperature threshold. In one example, this threshold temperature is 35 degrees Celsius. In another example, the threshold temperature is 40 degrees Celsius. It should be understood that any other temperature threshold or range may be employed that is convenient. If process 300 determines from this comparison that the vehicle interior needs to be conditioned (e.g., the measured temperature of display(s) 112 is above the threshold), process 300 may then proceed to block 335. Alternatively, if the comparing indicates that the vehicle interior does not need to be conditioned (e.g., the measured temperature of display(s) 112 is below the threshold or otherwise within an acceptable temperature range), process 300 proceeds to block 320.

At block 320, process 300 may determine a timer and/or time period based upon a predicted thermal input. The time period may be for a timer associated with the thermal system controller 202 and monitoring of vehicle interior temperatures. The time period may be associated with the thermal controller 202 and/or monitoring of vehicle interior temperatures. In an example, a timer may be used for maintaining a sleep state of the thermal controller 202. Example approaches may determine the time period based upon a solar load, an ambient temperature, and/or a temperature of a vehicle component of the vehicle interior, e.g., display(s) 112. For example, where a predicted thermal input is expected to be relatively greater, e.g., a solar load is particularly high, ambient temperatures are high (e.g., on a hot and relatively sunny day), and/or a temperature of the vehicle component is already relatively high, a time period for a timer may be determined that is comparatively shorter than when the predicted thermal input is relatively lower. In an example approach, a lookup table may be employed to provide estimated timer lengths based upon one or more factors. Merely as examples, factors may include a difference between a threshold temperature and measured temperature, predicted solar load or weather, or the like. Accordingly, a timer may be determined based upon an input temperature difference and/or solar load. In such examples, a length of a timer may correspond to input temperature differences and/or solar loads, e.g., a temperature difference twice as great as another will result in a timer half as long, etc. Example approaches to determining a timer may also include a buffer. For example, if a model estimates that a monitored device will reach a temperature threshold in a given amount of time, a timer may be set based upon a percentage of that time, e.g., 10% less than the estimated time. Example models may use (a) a temperature of an interior component (e.g., display(s) 112, (b) an ambient temperature, and/or (c) a solar load as inputs to determine a predicted thermal input corresponding to a time period for a timer. In some examples, the vehicle 101 may measure these input directly using one or more sensors of the vehicle 101. Alternatively or in addition, the vehicle 101 may receive these inputs remotely, e.g., from a central office or controller (not shown), via cellular data network, etc. Moreover, process 300 may include learning aspects configured to modify or adjust timers based upon differences in predicted and actual results. Merely as one example, a difference between a predicted solar load and/or temperature of a vehicle cabin or interior may be compared with actual solar load and/or temperature of the vehicle cabin/interior. If the thermal controller 202 determines that a current temperature of the vehicle cabin is less than expected, the thermal controller 202 may increase the timer, and vice versa.

Proceeding to block 325, process sets the thermal controller 202 to wake upon expiration of the determined timer. Process 300 may then put the thermal controller 202 in the sleep state at block 330, and process 300 may then proceed back to block 305.

As can be seen by the operation of blocks 305-330, in some cases the thermal controller 202 may wake periodically, i.e., upon expiration of a timer set by process 300 and determination at block 315 that the vehicle interior does not need to be conditioned. Accordingly, process 300 may periodically check interior temperatures and/or other conditions associated with the vehicle 101 to determine whether and how to condition the vehicle interior as needed to reduce temperatures of one or more measured devices. In one example, the thermal controller 202 wakes other components of a vehicle system when a temperature of the vehicle interior is above a temperature threshold temperature (e.g., above 40 degrees Celsius). In other examples, solar load may be used as part of this determination, e.g., thermal controller 202 may wake other components when temperature exceeds the threshold and a solar load is also detected to be above a solar load threshold (e.g., more than 700 Watts per square meter ($W/m^2$).

It should be noted that the timers set at block 320 may be according to a same heuristic or methodology each time, or according to different methodologies depending upon certain circumstances. In one example, timers set at block 320 may always be determined based upon expected or predicted solar load and/or ambient temperatures. In another example, an initial timer set at block 320, e.g., upon initial shutdown of vehicle 101, may be set based upon an expected solar load or ambient temperature, while a subsequent timer, e.g., after process 300 has cycled through blocks 305, 310, and/or 315 at least once, may be based upon a simplified methodology, e.g., a fixed timer of a predetermined time such as 30 minutes. Accordingly, in examples where process 300 progresses through block 320 multiple times without requiring conditioning of the vehicle, e.g., during a relatively cool or unexpectedly cloudy day where actual solar load on the vehicle is lower than initially predicted, energy consumption of the thermal controller 202 may be further reduced by simplifying timer calculations. Additionally, timers set by the thermal controller 202 may employ a "learning" mechanism, e.g., where past results of timer expiration and detected conditions may inform calculation of a subsequent timer. Additionally, changes in observed conditions may be used in determining timers, such that decreasing ambient temperatures results in a longer determined timer, while increasing temperatures may shorten a determined timer.

It should be noted that in example approaches an initial timer determined on the basis of expected solar load, ambient temperature, or other parameter indicative of expected temperature rise (or lack thereof) with respect to a vehicle interior may advantageously reduce the frequency of wake/sleep cycles associated with monitoring. For example, where solar loads and/or ambient temperatures are relatively low, a timer may be set at block 320 that is relatively lengthy, reducing monitoring cycles and usage of available power resources, e.g., of a vehicle battery.

As noted above, where process 300 determines at block 315 that the vehicle interior needs to be conditioned, e.g., due to excess temperature of component(s) within the vehicle interior, process 300 proceeds to block 335. At block 335, process 300 may send an instruction, command, or message to initiate cooling of the vehicle 101. In an example, process 300 may wake the vehicle from the sleep state to facilitate conditioning of the vehicle interior. More specifically, the thermal controller 202 may wake one or more additional controllers or module of the vehicle 101. Accordingly, an instruction may be sent by the thermal controller 202, e.g., to wake the core controller 210. In another example, the thermal controller 202 may wake each of the other modules of the processing circuitry 200. Accordingly, blocks 305-335 generally maintain the vehicle and associated systems in a sleep or stealth state to minimize consumption of electrical power in the vehicle, while sending or initiating an instruction, e.g., by waking vehicle systems in response as may be needed to condition the vehicle.

Upon sending the instruction and/or waking of the vehicle/systems at block 335, process 300 may proceed to determine whether conditioning or other steps with respect to the interior are desired. In the illustrate example, process 300 proceeds to block 340, where process 300 determines whether conditioning is desired based upon temperatures of device 112. In other example approaches, process 300 may proceed directly to block 350. For example, process 300 may proceed directly to block 350 to the extent temperatures of the monitored devices 112 are considered or are part of a determination at block 315.

At block 350, the thermal controller 202 may initiate conditioning of the vehicle interior. In some examples, the vehicle 101 or components thereof, e.g., thermal controller 202, may determine appropriate conditioning responses. For example, process 300 may proceed to block 355, where a measured temperature of the vehicle interior, e.g., as determined by sensor 124, may be compared with an elevated temperature threshold. This elevated temperature threshold may exceed a temperature threshold initially used to determine whether conditioning is needed, e.g., at block 315. Where process 300 determines that the measured temperature does not exceed the elevated threshold, process 300 may proceed to block 365, where a relatively less significant conditioning response may be implemented. In an example, the conditioning response at block 365 may include circulating air from outside the vehicle to the interior, e.g., by opening a window 150, running a circulating fan, or the like. On the other hand, where process 300 determines at block 355 that the measured temperature exceeds the elevated/second temperature threshold, process 300 may proceed to block 360, where a relatively more significant conditioning response may be implemented. In an example, the thermal controller 202 may actuate a compressor of an air conditioning system of the vehicle 101, thereby refrigerating air within the interior of the vehicle, e.g., by refrigerating air circulated to the vehicle interior. Alternatively or in addition, conditioning responses may include changing position of HVAC vents, e.g., to direct air/refrigerated air to one or more desired areas of a vehicle interior. Accordingly, process 300 may facilitate determination of appropriate levels of conditioning responses based upon detected temperatures. Responses by the thermal controller 202 at blocks 360 and/or 365 may be determined as, for example, a period of time expected to bring temperature of a measured device 112 within acceptable ranges. For example, at block 365 the thermal controller 202 may run a fan or blower of the vehicle system, or open one or more windows 150 of the vehicle for a determined period of time. As another example, at block 360 the thermal controller 202 may operate a refrigeration system or air conditioning system of the vehicle for a determined period of time. In another example, system responses initiated at blocks 360/365 may be run continuously until such time that process 300 determines that a measured device 112 is within appropriate temperature range(s), within any relevant power consumption limits, e.g., with respect to battery packs 220 and/or 222.

As noted above, process 300 may facilitate conditioning of a vehicle while also reducing the extent to which on-board vehicle power resources, e.g., of a vehicle battery, may be used as part of the monitoring effort. The vehicle 101, however, may also employ conditioning responses when the vehicle is plugged in or otherwise not in a sleep state where power conservation may be relatively more important. Returning to block 305 of process 300, where process 300 determines that the vehicle is awake, process 300 may proceed to block 370.

At block 370, process 300 may query whether a user is present in the vehicle, e.g., a driver. Where a user is present, process 300 may proceed to block 375, where any conditioning of the cabin is processed in response to user requests, e.g., via the HVAC system of the vehicle. On the other hand, if there is no user in the car (e.g., the vehicle is charging or the user has temporarily left the vehicle while the vehicle is awake), the vehicle may automatically determine whether conditioning responses may be needed. It should also be noted that when the vehicle is charging, there may be fewer limitations on obtaining information, e.g., due to modules or components that might otherwise in a sleep mode. In an example, a threshold temperature(s) may be used in substantially similar fashion as described at block 315. More specifically, where the temperature of a monitored component, e.g., display 112, is determined to be above a threshold temperature, process 300 may proceed to blocks 350-365 to implement conditioning responses as determined to be appropriate. On the other hand, if conditioning of the vehicle interior is not needed, process 300 may proceed to block 345, wherein a conditioning response is not required. Process 300 may then proceed back to block 305.

Accordingly, example approaches for vehicle systems and methods may generally facilitate monitoring of interior component temperatures automatically, i.e., without requiring intervention or control by a user or driver of the vehicle. While example components that may be monitored have been described above as including displays or other sensitive electronic components, it should be noted that example methods can be applied in the context of any interior component for which there is a desire to monitor temperature and/or prevent excess temperatures. By reducing overall system power requirements, example approaches may generally allow monitoring strategies that are not limited to a fixed time after a vehicle is powered down or enters a sleep state.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:
1. A vehicle system, comprising:
 a vehicle component in an interior of a vehicle; and
 a thermal controller configured to:
  determine a timer based on a predicted thermal input and a sleep state;
  based on the timer, compare a temperature of the vehicle component to a temperature threshold; and
  send an instruction to reduce the temperature of the vehicle component based on the comparison of the temperature to the temperature threshold.
2. The vehicle system of claim 1, wherein the thermal controller is configured to:
 start the timer based on an initiation of the sleep state; and
 wake from the sleep state based on the timer expiring.
3. The vehicle system of claim 2, further comprising one or more additional controllers having a sleep state, wherein the thermal controller is configured to maintain the one or more additional controllers in their sleep state, respectively, when the temperature is below the temperature threshold.
4. The vehicle system of claim 3, wherein the thermal controller is configured to periodically wake to a stealth mode, wherein the one or more additional controllers remain in a sleep state when the thermal controller determines the temperature of the vehicle component is below the temperature threshold.

5. The vehicle system of claim 1, wherein the predicted thermal input is based on at least one of a solar load, an ambient temperature, or the temperature of the vehicle component.

6. The vehicle system of claim 1, wherein the predicted thermal input is determined based on at least one of a difference between the temperature of the vehicle component and the temperature threshold, or a predicted solar load.

7. The vehicle system of claim 1, wherein the thermal controller is configured to enter the sleep state, wherein a core controller is configured to initiate the sleep state of the thermal controller based on at least one of a detection of a vacant vehicle interior, a reduction in a current draw of a vehicle battery, or a contactor position of the vehicle battery.

8. The vehicle system of claim 1, wherein the vehicle system is configured to, in response to sending the instruction, automatically determine a conditioning response based upon the temperature of the vehicle component.

9. The vehicle system of claim 8, wherein the temperature threshold is a first temperature threshold, and wherein the conditioning response comprises:
cooling the vehicle interior by circulating air to the vehicle interior when the temperature of the vehicle component is below a second temperature threshold greater than the first temperature threshold; and
refrigerating the air circulated to the vehicle interior when the temperature of the vehicle component exceeds the second temperature threshold.

10. The vehicle system of claim 1, wherein the thermal controller is configured to control a heating/ventilation/air conditioning (HVAC) system associated with the vehicle interior.

11. The vehicle system of claim 1, wherein the vehicle component includes one or more display screens in the vehicle interior.

12. The vehicle system of claim 1, wherein the thermal controller is further configured to receive a manual input to initiate cooling the interior.

* * * * *